United States Patent
Nishiguchi et al.

(10) Patent No.: US 6,265,079 B1
(45) Date of Patent: Jul. 24, 2001

(54) CATIONIC ELECTRODEPOSITION COATING COMPOSITION

(75) Inventors: Shigeo Nishiguchi, Hiratsuka; Reiziro Nishida, Chigasaki; Fumiaki Nakao, Hiratsuka; Tadayoshi Hiraki, Odawara; Akira Tominaga, Chigasaki, all of (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 09/463,597

(22) PCT Filed: Jul. 28, 1998

(86) PCT No.: PCT/JP98/03346

§ 371 Date: Jan. 28, 2000

§ 102(e) Date: Jan. 28, 2000

(87) PCT Pub. No.: WO99/06493

PCT Pub. Date: Feb. 11, 1999

(30) Foreign Application Priority Data

Jul. 29, 1997 (JP) .................................................. 9-202689
Sep. 16, 1997 (JP) .................................................. 9-249253
Dec. 12, 1997 (JP) .................................................. 9-342343

(51) Int. Cl.$^7$ ............................. B32B 15/08; C25D 13/00

(52) U.S. Cl. ................ 428/457; 204/499; 204/505; 204/506; 523/415

(58) Field of Search ................................. 204/499, 505, 204/506; 523/415; 428/457

(56) References Cited

U.S. PATENT DOCUMENTS 5,908,912 * 6/1999 Kollal et al. ......................... 204/499
5,936,013 * 8/1999 Feola et al. ......................... 523/414

FOREIGN PATENT DOCUMENTS 7-506870  7/1995  (JP) .

* cited by examiner

*Primary Examiner*—Kishor Mayekar
(74) *Attorney, Agent, or Firm*—Wenderoth, Lind & Ponack, L.L.P.

(57) ABSTRACT

There is disclosed a cationic electrodeposition coating composition containing bismuth lactate derived from a lactic acid, whose L-isomer content is at least 80% by weight, or bismuth methoxyacetate in a form of being dissolved in an aqueous medium. The electrodeposition coating composition can form a coating film having excellent anticorrosivity and finishing property without containing a lead compound.

8 Claims, No Drawings

CATIONIC ELECTRODEPOSITION COATING COMPOSITION

This application is a 35 U.S.C 371 National Stage application of International application PCT/JP98/03346 filed Jul. 28, 1998.

TECHNICAL FIELD

The present invention relates to a cationic electrodeposition coating composition and more specifically relates to a lead-free cationic electrodeposition coating composition capable of forming an electrodeposition coating film excellent in anticorrosivity, finishing property etc.

BACKGROUND ART

As an electrodeposition paint is excellent in throwing power and capable of forming a coating excellent in such properties as durability, anticorrosivity etc., it has been widely used hitherto in the application fields, in which such properties are required, for example, coating of a car body, coating of electric appliances etc.

In an electrodeposition paint there are often compounded anticorrosive pigments, for example, lead compounds or chromium compounds such as lead chromate, basic lead silicate, strontium chromate etc. in order to further improve it anticorrosivity. These compounds, however, are very harmful substances and their usage is problematic for countermeasures against pollution. Therefore, the usage of zinc phosphate, iron phosphate, aluminium phosphate, calcium phosphate, zinc molybdate, calcium molybdate, zinc oxide, iron oxide, aluminium phosphomolybdate, zinc phosphomolybdate has been hitherto investigated as a non-toxic or low-toxic anticorrosive pigment replacing lead compounds or chromium compounds. These compounds, however, are less anticorrosive than the aforementioned lead compounds or chromium compounds and not practically satisfactory.

It is already known that bismuth is effective as a metal exhibiting as good or even better anticorrosivity than lead compounds or chromium compounds in an electrodeposition paint and, above all, bismuth lactate is particularly effective.

For example, Japanese PCT Publication No. 506870/1995 (=WO93/24578 Pamphlet) discloses a preparation process of a catalyst -containing cationic coating binder containing a cationic coating binder, which can be diluted with water after protonation and can be crosslinked through transesterification an or transamidation and/or transurethanization and/or reaction of terminal double bonds, and bismuth salts of an aliphatic hydroxycarboxylic acid, preferably lactic acid or dimethylolpropionic acid. And said Publication describes that the bismuth salts are obtained by reactin 1 mole of bismuth oxide with 7 moles of an aliphatic hydroxycarboxylic acid. The isolated, dried bismuth salts obtained by this process, however, have a tendency of caking during storage. Moreover the bismuth salts obtained by this process easily produce aggregation or precipitation during the preparation procedures. The tendency is stronger, when less amount of acid is used and it is difficult to use it as a homogeneous aqueous solution. As the amount of acid used for the reaction is more than the amount necessary to neutralize the coating binder in a paint, there rises a problem that the amount of current required during operation of an electrodeposition bath increases considerably.

The present inventors thought that a bismuth salt could be dispersed stably and homogeneously the electrodeposition bath, if a bismuth salt with good water-solubility is used, and such a problem as mentioned above could be solved. As a result of looking for a bismuth salt which does not cake during storage and has a good water-solubility, they found, this time, that bismuth lactate derived from an optically active lactic acid with high L-isomer content and bismuth methoxyacetate are suitable and completed the present invention.

DISCLOSURE OF THE INVENTION

Thus, according to the present invention, there is provided a cationic electrodeposition coating composition characterized by containing bismuth lactate derived from a lactic acid, whose L-isomer content is at least 80% by weight, or bismuth methoxyacetate in a form of being dissolved in an aqueous medium.

The cationic electrodeposition coating composition of the present invention has various excellent effects such as containing a bismuth compound in a state of being dissolved in an aqueous medium, having good storage stability, capable of being homogeneously dispersed in the electrodeposition bath, and capable of forming an electrodeposition coating film excellent in finishing property, anticorrosivity etc. without using a lead compound.

BEST MODE OR CARRYING OUT THE INVENTION

Bismuth lactate and bismuth methoxyacetate used in the electrodeposition coating composition of the present invention can be prepared, for example, by reacting lactic acid or methoxyacetic acid with a bismuth compound in an aqueous medium.

In the present invention, as lactic acid used to produce the above-mentioned bismuth lactate, an optically active lactic acid, whose L-isomer content is more than 80% by weight, preferably more than 85% by weight, more preferably more than 90% by weight, is used. Such an optically active lactic acid can be easily prepared, for example, by a fermentation process (cf. Big Dictionary of Chemistry 6' edited by the Editing Committee of the Big Dictionary of Chemistry, p.812, published by Kyoritsu Publishing Co., Ltd. in 1963). Methoxyacetic acid used to produce bismuth methoxyacetate is known and a product from the market can be used.

The above-mentioned optically active lactic acid and methoxyacetic acid can be used each singly or can be used both together in an optional ratio. Furthermore, as necessary, there can be used another organic acid, for example, an aliphatic carboxylic acid with a carbon number of less than 6, preferably less than 5, for example, acetic acid, propionic acid etc., together with these acids in a ratio, in which the water-solubility of the bismuth salt to be formed would not substantially be lowered.

As a bismuth compound there are mentioned, for example, bismuth oxide, bismuth hydroxide, basic bismuth carbonate etc. Above all bismuth oxide is preferable.

The using ratio of both reactants, when the above-mentioned lactic acid or methoxyacetic acid is reacted with a bismuth compound, can be varied in a wide range according to the kind of used compound etc. For example, in case bismuth oxide is used as a bismuth compound, it is preferable to use lactic acid generally 2–10 moles, particularly 3–8 moles and methoxyacetic acid generally 3–8 moles, particularly 3.4–7 moles per 1 mole of bismuth oxide. In case bismuth hydroxide is used as a bismuth compound, it is preferable to use lactic acid generally 1–5 moles, particularly 1.5–4 moles and methoxyacetic acid generally 1.5–4 moles, particularly 1.7–3.5 moles per 1 mole of bismuth hydroxide.

The reaction of the above-mentioned lactic acid or methoxyacetic acid with a bismuth compound can be conducted at the temperatures of generally room temperature to about 90° C., preferably about 35–about 80° C. and the reaction time can be in the range of about 1–about 30 hours according to said reaction.

Thus, bismuth lactate or bismuth methoxyacetate is obtained in a form of an aqueous solution dissolved in an aqueous medium and it is desirable to introduce these bismuth salts not being isolated but in the form of aqueous solution as such into the electrodeposition coating composition. The concentration (solid content concentration) of the bismuth salt in the aqueous solution in that case can be in the range of generally 0.1–80% by weight, preferably 0.5–70% by weight, more preferably 1–60% by weight.

The introduction of the above-mentioned aqueous solution of bismuth lactate or aqueous solution of bismuth methoxyacetate (hereinafter referred to as aqueous solution of bismuth salt) may be conducted at any stage before or after dispersing the electrodeposition coating composition in water. Generally, however, it is desirable to add the aqueous solution of bismuth salt after dispersing the electrodeposition coating composition in water from the viewpoint of easy compounding of the coating composition, storage stability etc. In this case the solid content concentration of the aqueous solution of bismuth salt to be added is preferably less than 60% by weight, particularly less than 40% by weight from the viewpoint of homogeneous dispersibility etc.

In the present invention the compounding amount of the aqueous solution of bismuth salt to the electrodeposition coating composition is not strictly prescribed but can be varied in a wide range according to the performances desired to the electrodeposition paint etc. It can be compounded generally as the content of bismuth metal in the range of 0.1–10 parts by weight, preferably 0.3–7.5 parts by weight, more preferably 0.5–5 parts by weight per 100 parts by weight of the resin solid content in the electrodeposition coating composition.

The cationic electrodeposition coating composition, to which a bismuth salt can be compounded according to the present invention, is not strictly limited but can be selected from a wide range according to the kind of substrate, desired properties of the coating film etc. Usually there is used a product made by compounding a base resin containing cationizable functional group suitably with curing agent and other additives for paint and dispersing in water.

As the above-mentioned base resin there can be used, for example, resins of epoxy type, acrylic type, polybutadiene type, alkyd type, polyester type etc. containing functional group, which is cationizable by acid neutralization, such as amino group, or functional group such as onium salt, for example, quaternary ammonium salt. Above all a polyamine resin represented by an amine-added epoxy resin is preferable.

As the above-mentioned amine-added epoxy resin there can be mentioned, for example, (i) an adduct of an epoxy resin with a primary mono- and polyamine, secondary mono- and polyamine, or primary/secondary mixed polyamine (cf. for example, U.S. Pat. No. 3,984,299 Specification); (ii) an adduct of an epoxy resin with a secondary mono- and polyamine having ketiminized primary amino group (cf. for example, U.S. Patent No. 4,017, 438 Specification); (iii) a reaction product obtained by etherification of an epoxy resin and a hydroxy compound having ketiminized primary amino group (cf. for example, Japanese Laid-open Patent Publication No. 43013/1984).

The epoxy resin used to produce the above-mentioned amine-added epoxy resin is a compound having more than 2 epoxy groups in the molecule and has preferably a number-average molecular weight in the range of generally at least 200, preferably 400–4000, more preferably 800–2000. Particularly a substance obtained by a reaction of a polyphenol compound and epichlorohydrin is preferable. As a polyphenol compound usable to form said epoxy resin there can be mentioned, for example, bis(4-hydroxyphenyl)-2,2-propane, 4,4-dihydroxybenzophenone, bis(4-hydroxyphenyl)-1,1-ethane, bis(4-hydroxyphenyl)-1,1-isobutane. bis(4-hydroxy-tert-butyl-phenyl) -2,2-propane, bis(2-hydroxynaphthyl)methane, tetra(4-hydroxyphenyl)-1,1,2,2-ethane, 4,4-dihydroxydiphenylsulfone, phenol novolac, cresol novolac etc.

Said epoxy resin may be partially reacted with polyol, polyether polyol polyester polyol, polyamide amine, polycarboxylic acid, polyisocyanate compound etc. and further may be graft-polymerized with $\epsilon$-caprolactone, acrylic monomer etc. Moreover, as an epoxy resin, there can be used, besides the above-mentioned, a reaction product of a polyol and epichlorohydrin, a reaction product of said reaction product and a polyphenol compound, a substance obtained by oxidizing an unsaturated compound with peracetic acid etc.

The above-mentioned base resin may be of any type of either outer-crosslinking type or inner(or self)-crosslinking type. As a curing agent usable together in case of an outer-crosslinking type resin there can be used hitherto known crosslinking agent, particularly a blocked polyisocyanate compound is preferable. There can be used, however, tris(alkoxycarbonylamino)triazine, (methylolized) melamine resin etc., too. As an inner crosslinking type resin, for example, a substance, in which a blocked polyisocyanate type has been introduced, is preferable.

A blocked polyisocyanate compound usable together with the above-mentioned outer-crosslinking type base resin can be an addition reaction product of a polyisocyanate compound and an isocyanate-blocking agent and as the polyisocyanate compound used in this case there can be mentioned, for example, aromatic, alicyclic or aliphatic diisocyanate compounds such as tolylene diisocyanate, xylylene diisocyanate, phenylene diisocyanate, bis (isocyanatomethyl) cyclohexane, tetramethylene diisocyanate, hexamethylene diisocyanate, methylene diisocyanate, isophoron diisocyanate and their isocyanurates, compounds containing terminal isocyanate obtained by reacting an excess amount of these isocyanate compounds with a low molecular active hydrogen-containing compound such as ethylene glycol, propylene glycol trimethylolpropane, hexanetriol etc.

On the other hand, an isocyanate-blocking agent is a substance to be added to an isocyanate group of a polyisocyanate compound and to temporarily block it and the blocked polyisocyanate compound formed by the addition is desirably stable at normal temperature and capable of reproducing a free isocyanate group, dissociating the blocking agent, at the time of being heated to a baking temperature of about 100–about 200° C. As a blocking agent meeting such requirements there can be mentioned, for example, lactam type compounds such as $\epsilon$-caprolactam, $\gamma$-butyrolatam etc.; oxime type compounds such as methyl ethyl ketoxime, cyclohexanone oxime etc.; phenol type compounds such as phenol, p-tert-butyl-phenol, cresol etc.; aliphatic alcohols such as n-butanol, 2-ethyl-hexanol etc.; aromatic alkyl alcohol such as phenylcarbinol, methyl-phenylcarbinol etc.; ether alcohol type compounds such as ethylene glycol monobutyl ether etc. Among them, blocking agents of oxime type and lactam type are blocking agents, which dissociate at relatively low temperature, and therefore particularly preferable from the point of curability of the electrodeposition coating composition.

The introduction of a blocked isocyanate group in a base resin in a self-crosslinking type resin having blocked isocyanate group in the base resin molecule can be conducted by using a hitherto known process. For example, it can be introduced by reacting a free isocyanate group in a partially blocked polyisocyanate compound and an active hydrogen-containing part in the base resin.

Dispersing of a base resin in water through neutralization is conducted usually by neutralizing said resin with a water-soluble organic acid such as formic acid, acetic acid etc. In that case, a part or the whole of the aforementioned aqueous solution of bismuth lactate or aqueous solution of bismuth methoxyacetate can be used for neutralization. It is preferable to use acetic acid and/or formic acid as a neutralizing agent, because a coating composition excellent in finishing property, throwing power, low temperature curability etc. can be obtained.

The cationic electrodeposition coating composition of the present invention can be obtained by adding the above-mentioned aqueous solution of bismuth lactate or aqueous solution of bismuth methoxyacetate to a water dispersion of a base resin thus obtained and by mixing homogeneously.

In the electrodeposition coating composition of the present invention a tin compound can be further contained, as necessary, as a curing catalyst. As said tin compound there can be mentioned, for example, organotin oxides such as dibutyltin oxide, dioctyltin oxide etc.; aliphatic or aromatic carboxylates of dialkyltin such as dibutyltin dilaurate, dioctyltin dilaurate, dibutyltin diacetate, bis(dioctyl benzoyloxytin)oxide, bis(dibutyl benzoyloxytin)oxide, dioctyltin dibenzoate, dibutyltin dibenzoate etc. Among them, dialkyltin aromatic carboxylates are preferable from the viewpoint of low temperature curability. The content of a tin compound in an electrodeposition coating composition is not strictly prescribed but can be varied in a wide range according to the performances required to the electrodeposition paint etc. The tin content is preferably in the range of usually 0–8 parts by weight, preferably 0.05–5 parts by weight per 100 parts by weight of the resin solid content in the electrodeposition coating composition.

Moreover, in the electrodeposition coating composition of the present invention a zinc compound can be further contained, as necessary, as an anticorrosive pigment. As said zinc compound there can be mentioned, for example, zinc phosphate, zinc formate, zinc acetate, zinc molybdate, zinc oxide, zinc phosphomolybdate etc. The content of a zinc compound in an electrodeposition coating composition is not strictly prescribed but can be varied in a wide range according to the performances required to the electrodeposition paint etc. The zinc content is preferably in the range of usually 0–8 parts by weight, preferably 0.05–5 parts by weight per 100 parts by weight of the resin solid content in the electrodeposition coating composition.

In the electrodeposition coating composition of the present invention there can be further compounded, as necessary, additives for paint such as color pigment, extender pigment, organic solvent, pigment dispersing agent, coating surface adjustment agent etc.

The electrodeposition coating composition of the present invention can coat a desired substrate surface by electrodeposition coating. The electrodeposition coating can be conducted generally in an electrodeposition bath comprising the electrodeposition coating composition of the present invention diluted with deionized water etc. to the solid content concentration of about 5–40% by weight and adjusted its pH in the range of 5.0–9.0 under the condition of the bath temperature usually adjusted to 15–35° C. and the load voltage of 100–400V.

The film thickness of the electrodeposition coating film formable by using the electrodeposition coating composition of the present invention is not particularly limited but is preferable generally in the range of 10–40 μm based upon a cured coating film. The baking temperature of the coating film is preferable generally in the range of about 100–about 200° C.

EXAMPLES

Then the present invention is described more specifically by mentioning examples. The present invention, however, is not restricted by this in any way. "Parts" and "%" mean "parts by weight" and "% by weight".

Preparation of a Clear Emulsion for Cationic Electrodeposition Coating

1900 Parts of "EPIKOTE 1004" (*1) was dissolved in 1012 parts of butyl cellosolve, to which 124 parts of diethylamine was added at 80–100° C. drop by drop and the mixture was kept at 120° C. for 2 hours to obtain amine-adduct of epoxy resin with an amine value of 47.

Then 1000 parts of dimer acid type polyamide resin (trade name: "Versamid 460" made by Henkel Japan, Limited) with an amine value of 100 was dissolved in 429 parts of methyl isobutyl ketone, refluxed by heating at 130–150° C. and the formed water was distilled off to convert the terminal amino group of said amide resin into ketimine. The mixture was kept at 150° C. for about 3 hours and cooled to 60° C. after the distillation of water was finished. Then the mixture was added to the aforementioned amine-adduct of epoxy resin, heated to 100° C., kept for 1 hour and cooled to room temperature to obtain a varnish of an epoxy resin-aminopolyamide-added resin with solid content of 68% and amine value of 65.

103 Parts (70 parts as resin solid content) of the varnish obtained as mentioned above, 30 parts (as solid content) of 2-ethylhexyl alcohol-blocked product of tolylene diisocyanate and 15 parts of 10% acetic acid were compounded and stirred homogeneously, to which 150 parts of deionized water was added drop by drop in about 15 minutes while vigorously stirring to obtain a clear emulsion for cationic electrodeposition coating with solid content of 33.6%.

(*1) "EPIKOTE 1004": Bisphenol A type epoxy resin, made by Yuka Shell Epoxy K.K., epoxy equivalent about 950.

Preparation of Aqueous Solution of Bismuth Lactate and Aqueous Solution of Bismuth Methoxyacetate Preparation Example 1

300 g of 90% L-lactic acid (containing 10% water; 3 moles as L-lactic acid) and 657 g of deionized water were put in a flask and heated to 60° C., to which then 233 g (0.5 moles) of bismuth oxide was slowly added and stirred at 60° C. for 4 hours to react. After confirming that the reaction solution did not contain a yellow solid any more and became transparent, 3572 g of deionized water was added to obtain an aqueous solution of bismuth lactate ① with solid content of 10%.

Preparation Example 2

250 g of 90% L-lactic acid (containing 10% water; 2.5 moles as L-lactic acid) and 606 g of deionized water were put in a flask and heated to 60° C., to which then 233 g (0.5 moles) of bismuth oxide was slowly added and stirred at 60° C. for 4 hours to react. After confirming that the reaction solution did not contain a yellow solid any more and became transparent, 3270 g of deionized water was added to obtain an aqueous solution of bismuth lactate ② with solid content of 9.8%.

Preparation Example 3

200 g of 90% L-lactic acid (containing 10% water; 2 moles as L-lactic acid) and 555 g of deionized water were put in a flask and heated to 60° C., to which then 233 g (0.5 moles) of bismuth oxide was slowly added and stirred at 60° C. for 4 hours to react. After confirming that the reaction solution did not contain a yellow solid any more and became transparent, 2964 g of deionized water was added to obtain an aqueous solution of bismuth lactate ③ with solid content of 9.5%.

Preparation Example 4

300 g of 90% Lactic acid (containing 10% water; racemic modification of D/L=1/1) (3 moles as lactic acid) and 657 g of deionized water were put in a flask and heated to 60° C., to which then 233 g (0.5 moles) of bismuth oxide was slowly added and stirred at 60° C. for 4 hours to react. After confirming that the reaction solution did not contain a yellow solid any more and became transparent, 3572 g of deionized water was added whereby a large amount of insoluble matter was produced. The solid content of the aqueous solution ④ after filtration of the insoluble matter was 1.3%.

Preparation Example 5

150 g of 90% Lactic acid (racemic modification) (containing 10% water; 1.5 moles as lactic acid), 150 g of 90% L-lactic acid (1.5 moles as L-lactic acid) and 657 g of deionized water were put in a flask and heated to 60° C., to which then 233 g (0.5 moles) of bismuth oxide was slowly added and stirred at 60° C. for 5 hours to react. After confirming that the reaction solution did not contain a yellow solid any more and became transparent, 3572 g of deionized water was added whereby a large amount of insoluble matter was produced. The solid content of the aqueous solution ⑤ after filtration of the insoluble matter was 2.3%.

Preparation Example 6

270 g of methoxyacetic acid (3 moles as methoxyacetic acid) and 687 g of deionized water were put in a flask and heated to 60° C., to which then 233 g (0.5 moles) of bismuth oxide was slowly added and stirred at 60° C. for 4 hours to react. After confirming that the reaction solution did not contain a yellow solid any more and became transparent, 3572 g of deionized water was added to obtain an aqueous solution of bismuth methoxyacetate ⑥ with solid content of 10%.

Preparation Example 7

180 g of methoxyacetic acid (2 moles as methoxyacetic acid) and 570 g of deionized water were put in a flask and heated to 60° C., to which then 233 g (0.5 moles) of bismuth oxide was slowly added and stirred at 60° C. for 4 hours to react. After confirming that the reaction solution did not contain a yellow solid any more and became transparent, 2963 g of deionized water was added to obtain an aqueous solution of bismuth methoxyacetate ⑦ with solid content of 10%.

Preparation Example 8

200 g of 90% L-lactic acid (containing 10% water; 2 moles as lactic acid), 90 g of methoxyacetic acid (1 mole) and 835 g of deionized water were put in a flask and heated to 60° C., to which then 233 g (0.5 moles) of bismuth oxide was slowly added and stirred at 60° C. for 4 hours to react. After confirming that the reaction solution did not contain a yellow solid any more and became transparent, 3672 g of deionized water was added to obtain an aqueous solution of bismuth 1-lactate/methoxyacetate ⑧ with solid content of 10%.

Preparation Example 9

200 g of 90% L-lactic acid (containing 10% water; 2 moles as lactic acid), 60 g of acetic acid (1 mole) and 643 g of deionized water were put in a flask and heated to 60° C., to which then 233 g (0.5 moles) of bismuth oxide was slowly added and stirred at 60° C. for 4 hours to react. After confirming that the reaction solution did not contain a yellow solid any more and became transparent, 3347 g of deionized water was added to obtain an aqueous solution of bismuth 1-lactate/acetate ⑨ with solid content of 10%.

Preparation Example 10

180 g of methoxyacetic acid (2 moles as methoxyacetic acid), 60 g of acetic acid (1 mole) and 642 g of deionized water were put in a flask and heated to 60° C., to which then 233 g (0.5 moles) of bismuth oxide was slowly added and stirred at 60° C. for 4 hours to react. After confirming that the reaction solution did not contain a yellow solid any more and became transparent, 3345 g of deionized water was added to obtain an aqueous solution of bismuth methoxyacetate/acetate ⑩ with solid content of 10%.

Examples and Comparative Examples

Each cationic electrodeposition coating composition was obtained by adding and stirring each aqueous solution of bismuth salt prepared as mentioned above to the above-mentioned clear emulsion for cationic electrodeposition in the compounding composition shown in Table 1.

Coating Test

A dull finished cold rolled steel plate of 0.8×150×70 mm without chemical treatment (non-treated plate) and a dull finished cold rolled steel plate of the same size which was chemically treated with Palbond #3030 (made by Nihon Perkerizing Company, zinc phosphate treating agent) (chemically treated plate) was dipped respectively in each cationic electrodeposition coating composition obtained in the above-mentioned Examples and Comparative Examples and electrodeposition coating was conducted by using the plate as cathode. An electrodeposition coating film with a film thickness (based upon a dried film thickness) of about 20 $\mu$m was formed under the electrodeposition condition of a voltage of 300V, washed with water and then baked. Baking was conducted in 2 stages of atmospheric temperatures and for 20 minutes baking time by using an electric hot air drier. Performance test results of the obtained coating plates were shown in Table 1.

Performance tests were conducted according to the following methods.

(*1) Curability: The coating surface of each electrodeposition coating plate, obtained by baking at 150° C., was rubbed 20 times back and forth for about 3–4 cm length with 4-fold gauze soaked with methyl isobutyl ketone under about 4 kg/cm$^2$ pressure and then the appearance of the coating surface was visually observed and evaluated.

○: No scratch is observed on the coating surface.

Δ: Scratches are observed on the coating surface but the ground surface is not seen.

×: Coating film dissolves and the ground surface is seen.

(*2) Anticorrosivity: Cross-cut lines were cut in the electrodeposition coating film on each electrodeposition coating plate, obtained by baking at 170° C., with a knife reaching to the ground surface, to which salt water spray tests according to JIS Z-2371 were conducted for 480 hours on the non-treated plate and for 840 hours on the chemically treated plate and evaluated by the rust and blister width from the knife scratch according to the following standard.

◎: Maximum width of rust or blister is less than 1 mm from the cut part (one side).

○: Maximum width of rust or blister is more than 1 mm and less than 2 mm from the cut part (one side).

Δ: Maximum width of rust or blister is more than 2 mm and less than 3 mm from the cut part (one side) and blistering was rather remarkable at the flat part.

×: Maximum width of rust or blister is more than 3 mm from the cut part and blistering was seen all over the coating surface.

TABLE 1

|  |  | Example | | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 | 13 |
| Paint composition | Clear emulsion for cationic electrodeposition (parts) | 298 | 298 | 298 | 298 | 298 | 298 | 298 | 298 | 298 | 298 | 298 | 298 | 298 |
|  | Aqueous solution of bismuth salt — Kind | ① | ① | ① | ② | ③ | ① | ⑥ | ⑦ | ⑥ | ⑥ | ⑧ | ⑨ | ⑩ |
|  | Amount (parts) | 20 | 40 | 60 | 20 | 20 | 10 | 20 | 20 | 40 | 60 | 10 | 20 | 20 |
|  | 40% LSN105 (*2) (parts) | 2.5 | 2.5 | 2.5 | 2.5 | 2.5 | 2.5 | 2.5 | 2.5 | 2.5 | 2.5 | 5 | 2.5 | 2.5 |
|  | Zinc formate |  |  |  |  |  | 5 |  |  |  |  |  |  |  |
| Curability (baking temperature 150° C.) |  | ○ | ○ | ○ | ○ | ○ | ○ | ○ | ○ | ○ | ○ | ○ | ○ | ○ |
| Anticorrosivity (baking temperature 170° C.) | Non-treated plate | ○ | ○ | ○ | ○ | ○ | ○ | ○ | ○ | ○ | ○ | ○ | ○ | ○ |
|  | Chemically treated plate | ◎ | ◎ | ◎ | ◎ | ◎ | ◎ | ○ | ○ | ○ | ○ | ○ | ○ | ○ |

|  |  | Comparative Example | | | |
|---|---|---|---|---|---|
|  |  | 1 | 2 | 3 | 4 |
| Paint composition | Clear emulsion for cationic electrodeposition (parts) | 298 | 298 | 298 | 298 |
|  | Aqueous solution of bismuth salt — Kind | ④ | ⑤ | — | — |
|  | Amount (parts) | 60 | 60 | — | — |
|  | 40% LSN105 (*2) (parts) | 2.5 | 2.5 | 2.5 |  |
|  | Zinc formate |  |  |  | 5 |
| Curability (baking temperature 150° C.) |  | Δ | Δ | Δ | ○ |
| Anticorrosivity (baking temperature 170° C.) | Non-treated plate | x | x | x | x |
|  | Chemically treated plate | Δ | Δ | Δ | Δ |

(*2) 40% LSN105: trade name, made by Sankyo Organic Chemicals Co., Ltd., 40% solution of dibutyltin dibenzoate in butyl cellosolve/methyl isobutyl ketone.

What is claimed is:

1. A cationic electrodeposition coating composition comprising a base resin containing cationizable functional group, characterized by containing bismuth lactate derived from a lactic acid, whose L-isomer content is at least 80% by weight, or bismuth methoxyacetate in a form of being dissolved in an aqueous medium.

2. A composition set forth in claim 1 characterized by being added with an aqueous solution of bismuth lactate or an aqueous solution of bismuth methoxyacetate prepared by reacting a lactic acid, whose L-isomer content is at least 80% by weight, or methoxyacetic acid with a bismuth compound in an aqueous medium.

3. A composition set forth in claim 2 wherein the aqueous solution of bismuth lactate is obtained by reacting 2–10 moles of a lactic acid, whose L-isomer content is at least 80% by weight, with 1 mole of bismuth oxide in an aqueous medium.

4. A composition set forth in claim 2 wherein the aqueous solution of bismuth methoxyacetate is obtained by reacting 3–8 moles of methoxyacetic acid with 1 mole of bismuth oxide in an aqueous medium.

5. A composition set forth in claim 2 wherein an aqueous solution of bismuth lactate or an aqueous solution of bismuth methoxyacetate is added in such a ratio that the bismuth metal content per 100 parts by weight of resin solid content in the composition becomes in the range of 0.1–10 parts by weight.

6. A composition set forth in claim 1 which further contains a tin compound as a curing catalyst.

7. A cationic electrodeposition coating process characterized by conducting an electrodeposition coating by using an electrodeposition bath comprising the composition set forth in claim 1.

8. An article coated by using the cationic electrodeposition coating composition set forth in claim 1.

* * * * *